United States Patent [19]

Kusano et al.

[11] Patent Number: 5,041,304
[45] Date of Patent: Aug. 20, 1991

[54] SURFACE TREATMENT METHOD

[75] Inventors: Yukihiro Kusano, Tokorozawa; Masato Yoshikawa, Kodaira; Kazuo Naito, Kawasaki; Yukio Fukuura, Sayama; Satiko Okazaki, No. 20-11, Takaidohigashi 2-chome, Tokyo; Masuhiro Kogoma, No. 843-15, Shimoiikura, Wako, all of Japan

[73] Assignees: Bridgestone Corporation; Satiko Okazaki, both of Tokyo; Masuhiro Kogoma, Wako, all of Japan

[21] Appl. No.: 625,145

[22] Filed: Dec. 10, 1990

[30] Foreign Application Priority Data

Dec. 13, 1989 [JP] Japan .................................. 1-322872

[51] Int. Cl.$^5$ .............................................. B05D 3/06
[52] U.S. Cl. .................................... 427/41; 427/255.1; 427/255.6
[58] Field of Search ...................... 427/41, 255.1, 255.6

Primary Examiner—Bernard Pianalto
Attorney, Agent, or Firm—Oblon, Spivak, McClelland, Maier & Neustadt

[57] ABSTRACT

Plates, sheets, fibers and other articles can be rendered water repellent by subjecting the articles at their surface to a glow discharge plasma under atmospheric pressure. The treating gas is a mixture of an inert gas and a fluorinated compound in the form of a cyclic or unsaturated hydrocarbon having some or all of the hydrogen atoms thereof replaced by halogen groups including fluorine atoms. The surface treatment lowers the surface energy of the articles in a long lasting manner.

6 Claims, 3 Drawing Sheets

SURFACE TREATMENT METHOD

This invention relates to a method for surface treating an article by subjecting the article at its surface to a glow discharge plasma treatment under atmospheric pressure with a gas containing a fluorinated compound, thereby lowering the surface energy of the article.

BACKGROUND OF THE INVENTION

A number of techniques were proposed in the art for imparting water repellency to the surface of solid articles such as plastic articles. One typical attempt is to effect plasma treatment in vacuum with fluorides such as $CF_4$, $C_2F_6$, $SF_6$ and $NF_3$. The plasma treatment causes fluorine atoms and fluorinated groups to non-selectively bond with valence bonds available on the article surface to cover the article surface with the fluorine atoms and fluorinated groups, resulting in the article surface having a molecular structure analogous to polytetrafluoroethylene (Teflon) or a structure having fluorinated groups as typified by $CF_3$ groups. Consequently, the articles have so reduced surface energy that the surface becomes water repellent.

The plasma treatment with fluorides such as $CF_4$, $C_2F_6$, $SF_6$ and $NF_3$, however, achieves water repellency to a less satisfactory extent in a manner that water repellency diminishes within a relatively short time. Since the plasma treatment of this type generally requires a vacuum of about 10 Torr or lower, a vacuum apparatus of a large size is necessary for the commercial practice of plasma treatment, adding to installation investment and operation cost. If articles to be treated have relatively high contents of water and/or volatile plasticizers, these components will vaporize in a vacuum atmosphere to leave the article surface, sometimes interfering with the plasma treatment in imparting the desired function or property. Further, the plasma treatment of this type is difficult to apply to articles of low-melting materials because heat is often generated during the treatment.

Another attempt for imparting water repellency to articles is proposed by Japanese Patent Application Kokai No. 235339/1987 wherein the articles at the surface are subjected to glow discharge plasma treatment under atmospheric pressure with a mixture of a fluorinated compound such as $CF_4$, $C_2F_6$, $SF_6$ and $NF_3$ and an inert gas at atmospheric pressure, thereby reducing the surface energy of the article. This method achieves more lasting water repellency as compared with the plasma treatment of the aforementioned type. It does not need a large size vacuum apparatus because the treating pressure is approximate to atmospheric pressure. In addition, it is fully applicable to articles having relatively high contents of water and volatile plasticizers as well as to articles of low-melting materials because little heat is generated during treatment. However, the level of water repellency achieved by this treatment method is still unsatisfactory like the aforementioned vacuum plasma treatment. There is a need for improving water repellency.

On the other hand, some inorganic materials such as metals, semiconductors and metal oxides are difficult to directly treat with fluorides for imparting water repellency. To impart water repellency to such blank materials, Japanese Patent Application Kokai No. 238961/1986 discloses a method including the steps of first subjecting an article to glow discharge plasma treatment under atmospheric pressure with a mixture of a hydrocarbon gas and an inert gas to deposit a film of carbon or hydrocarbon on the article surface and then treating the coating for imparting water repellency. Unfortunately, the carbon or hydrocarbon film is deposited at a very slow rate of approximately 100 Å/min. In addition, this method is cumbersome because of the two-step process including film deposition and water repellency imparting steps. There is a need for a treatment method capable of imparting water repellency to even these inorganic materials.

SUMMARY OF THE INVENTION

An object of the present invention is to provide a new and improved surface treatment method which can readily subject materials which are believed unamenable to glow discharge plasma treatment under atmospheric pressure with conventional fluorides to treatment for reducing their surface energy and which can reduce the surface energy to a low level in a long lasting manner.

In the surface treatment of an article by subjecting the article at its surface to glow discharge plasma treatment under atmospheric pressure with a gas containing a fluorinated compound, thereby lowering the surface energy of the article, the inventors have found that effective surface energy lowering is accomplished when octafluorocyclobutane (OFB) and similar cyclic fluorinated hydrocarbons and hexafluoropropylene (HFP) and similar unsaturated fluorinated hydrocarbons are used as the fluorinated compound. The glow discharge plasma treatment under atmospheric pressure with such selected fluorinated compounds is well compatible with members having relatively high contents of water and volatile plasticizers, and well applicable to members of low-melting materials because of minimized heat generation during the treatment. Even those materials which are believed unamenable to glow discharge plasma treatment under atmospheric pressure with conventional fluorides can be treated in a single step for imparting water repellency thereto. The surface energy of any article can be reduced to a lower level than available with the prior art methods.

According to the present invention, there is provided a method for surface treating an article by subjecting the article at its surface to a glow discharge plasma under atmospheric pressure with a gas containing a fluorinated compound, thereby lowering the surface energy of the article. The fluorinated compound is a cyclic and/or unsaturated hydrocarbon having some or all of the hydrogen atoms thereof replaced by halogen groups including fluorine atoms.

While it is not intended to be bound to theory, the reason why the method of the invention can reduce the surface energy to a lower level than with the prior art methods is that the fluorinated compounds in the form of cyclic or unsaturated hydrocarbons having some or all of the hydrogen atoms thereof replaced by halogen groups including fluorine atoms polymerize and deposit on the article surface while retaining their molecular structure to a substantial extent. Since film deposition and water repellent modification occur at the same time, dielectric materials and materials which are believed unamenable to direct glow discharge plasma treatment under atmospheric pressure with conventional fluorides, for example, metals, metal oxides and semiconductors can be rendered fully water repellent on their surface through a simple step.

BRIEF DESCRIPTION OF THE DRAWINGS

The above and other objects, features, and advantages of the present invention will be better understood from the following description taken in conjunction with the accompanying drawings, in which.

DESCRIPTION OF THE PREFERRED EMBODIMENTS

Figure 1:
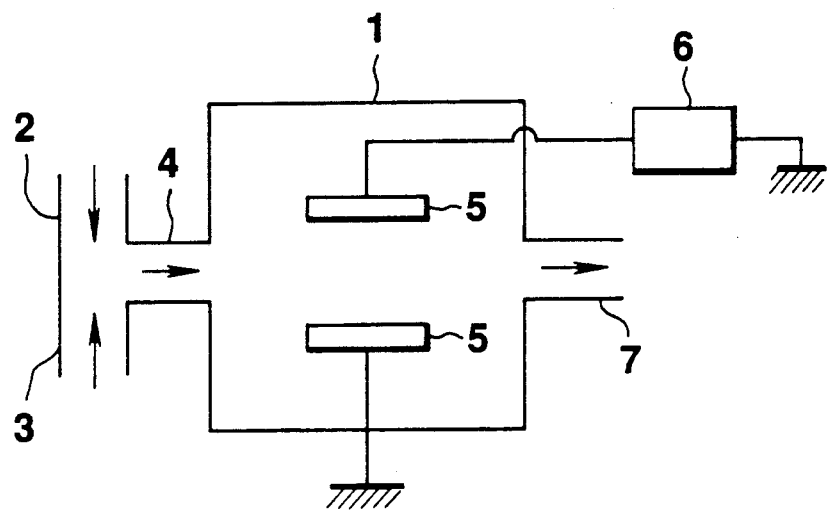
FIG. 1 is a schematic illustration of a plasma discharge apparatus used in Examples and Comparative Examples.

According to the present invention, the surface energy of an article is reduced by exposing the article at its surface to glow discharge plasma treatment under atmospheric pressure using a gas containing a fluorinated compound in the form of a cyclic or unsaturated hydrocarbon having some or all of the hydrogen atoms thereof replaced by halogen groups including fluorine atoms.

The cyclic hydrocarbons in which some or all of their hydrogen atoms are replaced by halogen groups including fluorine atoms include
hexafluorocyclopropane (Flon C.216),
1,1,2,2.tetrachlorotetrafluorocyclobutane (Flon C.314),
1,2.dichlorohexafluorocyclobutane (Flon C 316),
monochloroheptafluorocyclobutane (Flon C 317),
octafluorocyclobutane (Flon C.318, abbreviated as OFB),
1,2,2.trichloro.3,3,4,4.tetrafluorocyclobutane (Flon C. 324),
1,1.dichloro.2,2,3,3.tetrafluorocyclobutane (Flon C. 334),
1.chloro.2,2,3,3.tetrafluorocyclobutane (Flon C.344),
1,1,2,2.tetrafluorocyclobutane (Flon C.354),
1,2.dichlorotetrafluorocyclobutene (Flon C.1314),
hexafluorocyclobutene (Flon C.1316),
perfluorocyclopentane,
perfluorocyclohexane,
perfluorocycloheptane, etc.

The unsaturated hydrocarbons in which some or all of their hydrogen atoms are replaced by halogen groups including fluorine atoms include
trichloromonofluoroethylene (Flon 1111),
1,2.dichlorodifluoroethylene (Flon 1112),
1,1.dichlorodifluoroethylene (Flon 1112a),
monochloro.1,1,2.trifluoroethylene (Flon 1113),
tetrafluoroethylene (Flon 1114),
1,2.dichloro.2.fluoroethylene (Flon 1121),
1,1.dichloro.2.fluoroethylene (Flon 1121a),
1.chloro 2,2.difluoroethylene (Flon 1122),
1.chloro.1,2.difluoroethylene (Flon 1122a),
trifluoroethylene (Flon 1123),
1.chloro.2.fluoroethylene (Flon 1131),
1.chloro.1.fluoroethylene (Flon 1131a),
1,2.difluoroethylene (Flon 1142),
1,1.difluoroethylene (Flon 1142a),
fluoroethylene (Flon 1141),
hexafluoropropylene (abbreviated as HFP),
fluoropropylene,
difluoropropylene,
trifluoropropylene,
tetrafluoropropylene,
pentafluoropropylene,
octafluorobutene,
fluorobutene,
difluorobutene,
trifluorobutene,
tetrafluorobutene,
pentafluorobutene,
hexafluorobutene,
heptafluorobutene,
perfluoropentane, etc.

Especially preferred among these are HFP and OFB which are relatively inexpensive, readily available, stable in the ambient atmosphere, and effective in imparting satisfactory water repellency after treatment.

For the treatment, the fluorinated compound is used as a mixture thereof with a gas, preferably an inert gas. Examples of the inert gas include helium, neon, argon, nitrogen and mixtures thereof, with the helium gas being preferred.

The surface treatment method of the invention is by subjecting the article surface to glow discharge plasma treatment under atmospheric pressure with a mixture of an inert gas and a specific fluorinated compound. Plasma generation may be effected by any desired method which can generate a glow discharge plasma under atmospheric pressure and thereby induce reaction on the article surface. Exemplary plasma generation methods include direct current glow discharge and low frequency discharge in an internal electrode mode, high frequency discharge in an internal electrode, external electrode or coil mode, microwave discharge in a waveguide mode, and electron cyclotron resonance discharge. Especially preferred among these is low or high frequency discharge using internal electrodes, at least one of which is coated with an insulator.

It was believed that a "glow discharge plasma" can be created only under reduced pressure while the discharges which can be created under atmospheric pressure are nonuniform discharges at high temperatures, such as arc discharge, corona discharge and spark discharge. That is, the concept of a glow discharge under atmospheric pressure was not recognized. It was found that a glow discharge plasma under atmospheric pressure can be created in selected conditions as disclosed in Japanese Patent Application Kokai No. 235339/1987, 306569/1989, and 15171/1990. The requirements are the use of an inert gas such as helium, low or high frequency excitation, and the use of internal electrodes coated with an insulator.

The surface treatment method of the invention may be carried out by placing an article in a treating chamber, creating a plasma discharge zone in the chamber by the above-mentioned techniques, and continuously supplying a mixture of a specific fluorinated compound and a carrier gas into the chamber. The supply of the fluorinated compound may be selected depending on the temperature in the chamber during glow discharge plasma treatment under atmospheric pressure and the state of the fluorinated compound at room temperature. More particularly, fluorinated compounds which are gaseous at room temperature may be passed directly into the chamber. Fluorinated compounds which are liquid at room temperature, but have a relatively high vapor pressure may be supplied either directly in vapor form or by bubbling an inert gas into the liquid fluorinated compound. In turn, fluorinated compounds which are not gaseous and have a relatively low vapor pressure may be used after heating them to a gaseous state having a high vapor pressure.

The articles which can be surface treated for reducing surface energy according to the method of the invention may have any shape including plate, sheet, fiber, block and other shapes. The materials of which the articles are made are not particularly limited and encompass all the materials discussed herein and analogous materials. At the end of surface treatment according to the invention, the articles at the surface have a reduced surface energy and a low coefficient of friction therewith. Therefore, the method of the invention is effective not only in imparting water repellency to the articles by virtue of reduced surface energy, but also in imparting release property from adhesives and binders to the article surface by virtue of minimized friction. The invention is also effective in other applications where reduced surface energy and friction are required.

The surface treatment method of the invention results in a surface treated article having a reduced surface energy which will change little with the lapse of time. The method of the invention is effective in modifying even materials, which are believed unamenable to glow discharge plasma treatment under atmospheric pressure with conventional fluorides, to be fully water repellent in a simple manner.

EXAMPLE

Examples of the present invention is given below by way of illustration and not by way of limitation.

EXAMPLES 1-2, COMPARATIVE EXAMPLE 1

FIG. 1 illustrates a surface treating apparatus which includes a treating chamber 1, a line 2 for supplying a fluorinated compound, a line 3 for supplying a carrier gas in the form of an inert gas, a mixer/supply line 4 coupled to the chamber 1 for mixing the fluorinated compound and the inert gas and supplying the mixture to the chamber, and a line 7 coupled to the chamber 1 and opposed to the supply line 4 for exhausting the used gas. The flow of gas is shown by arrows. A pair of spaced electrodes 5 and 5 are disposed in the chamber 1, one electrode 5 being connected to a power supply 6 and the other electrode 5 being grounded. Both the electrodes are coated with an insulating material. The power supply 6 applies voltage across the electrodes 5 and 5 to create a plasma region therebetween. An article to be treated (not shown) is placed between the electrodes 5 and 5.

Using the apparatus illustrated in FIG. 1, samples of nylon fabric, 0.polyethylene terephthalate sheet (OPET), nonwoven fabric, glass plate, copper plate, stainless steel (SUS), brass plate, and aluminum plate were subjected to plasma treatment under a set of conditions A, B or C shown in Table 1.

The samples were measured for contact angle of a water droplet both before and after the surface treatment. The results are shown in Table 2.

TABLE 1

| Treatment | A | B | C |
| --- | --- | --- | --- |
| Pressure | 760 Torr | 760 Torr | 760 Torr |
| Fluorinated compound | $CF_4$ | hexafluoro-propylene | octafluoro-cyclobutane |
| Inert gas | He | He | He |
| Frequency | 9 KHz | 9 KHz | 3 KHz |

TABLE 1-continued

| Treatment | A | B | C |
| --- | --- | --- | --- |
| Treating time | 5 min. | 5 min. | 5 min. |

TABLE 2

| | Water contact angle (°) | | | |
| --- | --- | --- | --- | --- |
| | Initial | After treatment | | |
| | | A | B | C |
| Nylon fabric | 0 | 139 | 145 | 141 |
| O-PET | 65 | 110 | 115 | 109 |
| Nonwoven fabric | 0 | 134 | 138 | 139 |
| Glass plate | 0 | 0 | 116 | 112 |
| Cu plate | 92 | 49 | 114 | 112 |
| SUS plate | 51 | 40 | 114 | 113 |
| Brass plate | 85 | 48 | 111 | 118 |
| Al plate | 93 | 28 | 110 | 110 |
| Example | | CE1 | E1 | E2 |

As seen from Table 2, the method of the invention is effective in the surface treatment of all types of substrates for imparting a high degree of water repellency thereto.

EXAMPLE 3, COMPARATIVE EXAMPLES 2-3

Nylon fabric was subjected to treatment under a set of conditions A, B or D shown in Table 3. Treatment D was done by a conventional vacuum plasma treatment apparatus.

TABLE 3

| Treatment | A | B | D |
| --- | --- | --- | --- |
| Pressure | 760 Torr | 760 Torr | 1.0 Torr |
| Fluorinated compound | $CF_4$ | hexafluoro-propylene | hexafluoro-cyclopropylene |
| Inert gas | He | He | — |
| Frequency | 9 KHz | 9 KHz | 13.56 MHz |
| Treating time | 5 min. | 5 min. | 5 min. |

Figure 2:
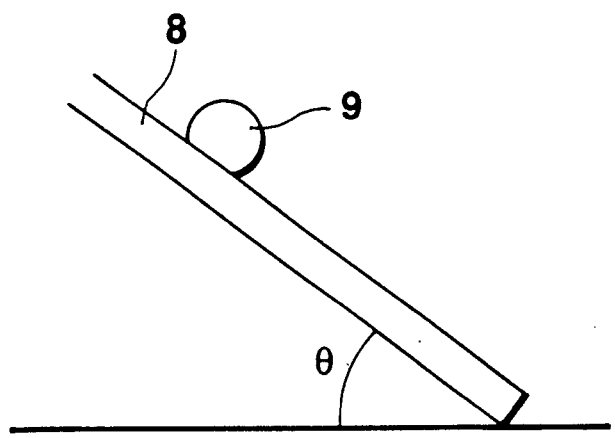
FIG. 2 illustrates how to measure the critical inclination angle.

To determine a change of water repellency with time, the treated nylon fabric samples were allowed to stand in an atmosphere at 50° C and relative humidity (RH) 90%. The water repellency was evaluated by a change of critical inclination angle as well as a change of contact angle of a water droplet. The critical inclination angle was determined as shown in FIG. 2 by placing a relatively large water droplet 9 (about 60 μl) on a substrate 8 of nylon fabric, and increasing the angle of inclination θ of the substrate 8 relative to the horizontal plane in a quasi-static manner until the water droplet 9 tumbled down.

Figure 3:
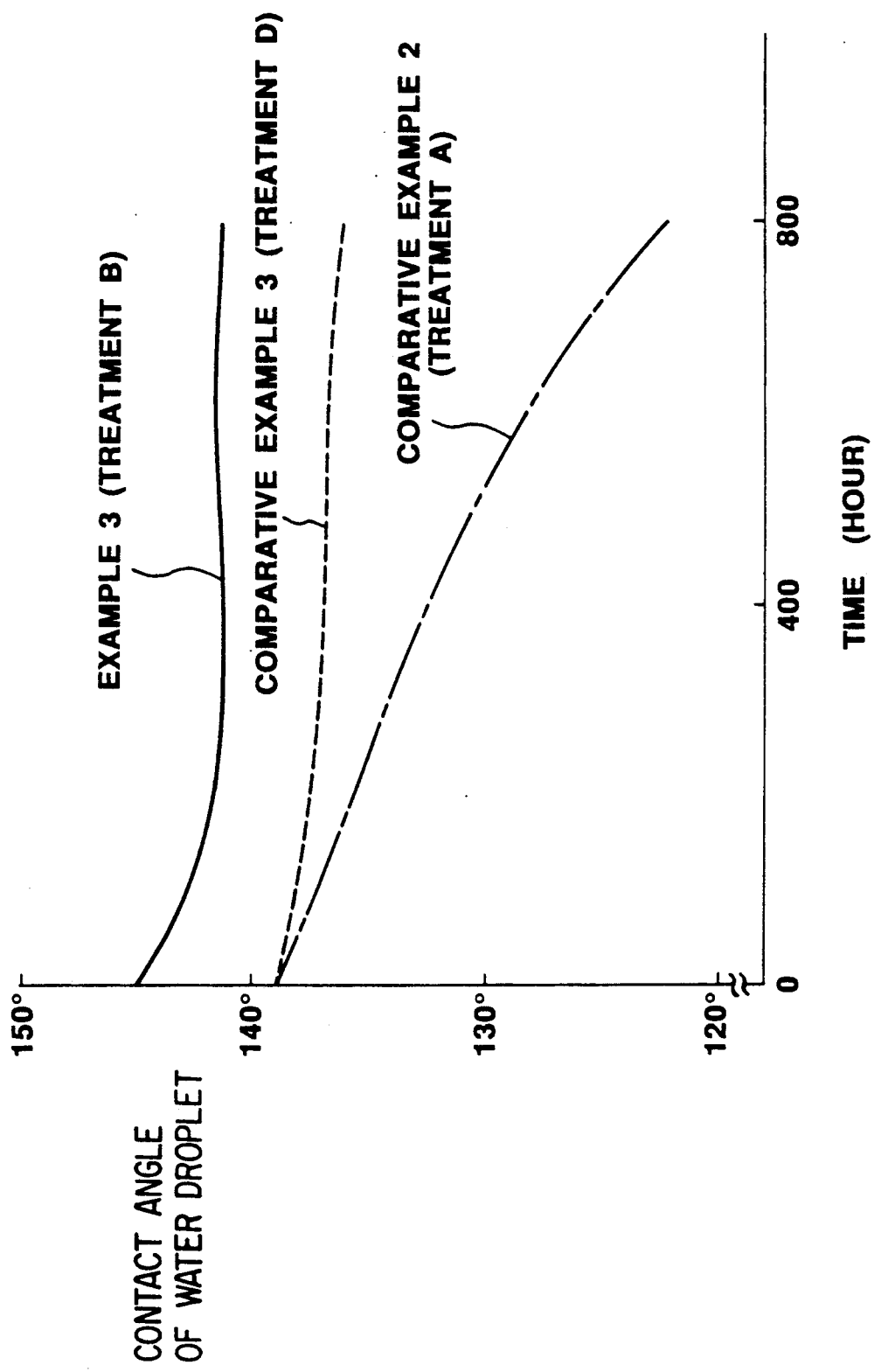
FIG. 3 is a graph showing the change with time of the water contact angle of nylon fabric samples treated in Example 2 and Comparative Examples 2 and 3.
Figure 4:
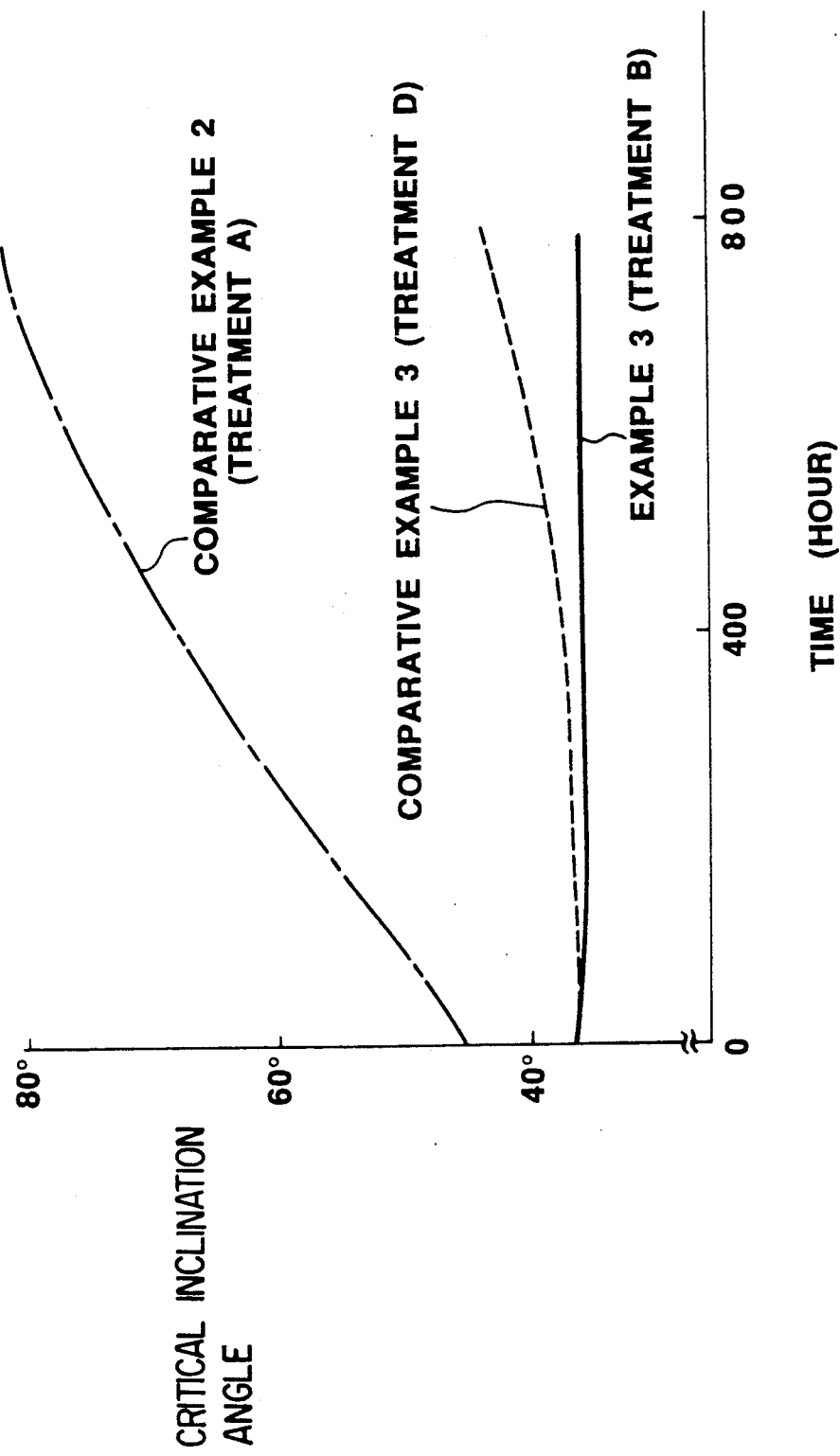
FIG. 4 is a graph showing the change with time of the critical inclination angle of the same nylon fabric samples.

FIG. 3 shows how the contact angle of a water droplet changed with time. FIG. 4 shows how the critical inclination angle changed with time.

As seen from FIGS. 3 and 4, the change with time of water repellency (restoration to be hydrophilic) is slower in the order of treatment A (Comparative Example 2), treatment D (Comparative Example 3), and treatment B (Example 3). The sample tailored by treatment B under atmospheric pressure showed little change with time, indicating the maintenance of high water repellency over a long period of time.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In a method for surface treating an article by subjecting the article at its surface to glow discharge plasma treatment under atmospheric pressure with a gas containing a fluorinated compound, thereby lowering the surface energy of the article, the improvement wherein said fluorinated compound is a cyclic or unsaturated hydrocarbon having some or all of the hydrogen atoms thereof replaced by halogen groups including fluorine atoms.

2. The method of claim 1 wherein said fluorinated compound is hexafluoropropylene.

3. The method of claim 1 wherein said fluorinated compound is octafluorocyclobutane.

4. The method of claim 1 wherein said gas is selected from the group consisting of helium, neon, argon, nitrogen, and mixtures thereof.

5. The method of claim 1 which is effective in imparting water repellency to the article surface.

6. The method of claim 1 which is effective in imparting release property to the article surface.

* * * * *